United States Patent
Sun

(10) Patent No.: US 10,863,518 B2
(45) Date of Patent: Dec. 8, 2020

(54) METHOD FOR HANDLING INTERFERENCE IN BLUETOOTH DEVICE HAVING OTHER WIRELESS TECHNOLOGY

(71) Applicant: MEDIATEK INC., Hsin-Chu (TW)

(72) Inventor: Juei-Ting Sun, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 73 days.

(21) Appl. No.: 16/180,227

(22) Filed: Nov. 5, 2018

(65) Prior Publication Data

US 2019/0159214 A1 May 23, 2019

Related U.S. Application Data

(60) Provisional application No. 62/589,612, filed on Nov. 22, 2017.

(51) Int. Cl.
| | |
|---|---|
| H04W 4/00 | (2018.01) |
| H04W 72/08 | (2009.01) |
| H04W 72/04 | (2009.01) |
| H04W 76/14 | (2018.01) |
| H04B 1/715 | (2011.01) |
| H04L 5/00 | (2006.01) |
| H04W 88/06 | (2009.01) |

(52) U.S. Cl.
CPC .......... *H04W 72/082* (2013.01); *H04B 1/715* (2013.01); *H04L 5/0012* (2013.01); *H04L 5/0062* (2013.01); *H04W 72/0453* (2013.01); *H04W 76/14* (2018.02); *H04B 2001/7154* (2013.01); *H04L 5/0073* (2013.01); *H04W 88/06* (2013.01)

(58) Field of Classification Search
CPC .......... H04W 72/082; H04W 72/0453; H04W 76/14; H04W 88/06; H04W 4/80; H04W 72/0493; H04L 5/0012; H04L 5/0062; H04L 5/0073; H04B 1/715; H04B 2001/7154; H04B 5/02

USPC .................................................. 370/329, 330

See application file for complete search history.

(56) References Cited

U.S. PATENT DOCUMENTS

| | | | | |
|---|---|---|---|---|
| 2002/0176445 A1* | 11/2002 | Melpignano | .......... | H04W 16/14 370/480 |
| 2005/0058153 A1 | 3/2005 | Santhoff et al. | | |
| 2010/0316089 A1* | 12/2010 | Liu | ........ | H04B 15/04 375/133 |
| 2011/0105027 A1* | 5/2011 | Linsky | .................. | H04B 1/715 455/41.2 |
| 2015/0133185 A1* | 5/2015 | Chen | ................. | H04W 72/1215 455/552.1 |

(Continued)

FOREIGN PATENT DOCUMENTS

WO 2006/068862 A2 6/2006

*Primary Examiner* — Chuong T Ho

(74) *Attorney, Agent, or Firm* — McClure, Qualey & Rodack, LLP

(57) ABSTRACT

A method for adjusting frequency channels in a Bluetooth device is provided. The method includes the following steps: providing Bluetooth circuitry and wireless-technology circuitry of the Bluetooth device, wherein the wireless-technology circuitry implements wireless technology other than Bluetooth; and responsive to a band used by the wireless-technology circuitry, replacing a plurality of in-band frequencies of a predetermined train by a plurality of out-of-band frequencies of another predetermined train by the Bluetooth circuitry.

20 Claims, 10 Drawing Sheets

(56) References Cited

U.S. PATENT DOCUMENTS

2018/0145544 A1\* 5/2018 Park .................. H04W 4/80

\* cited by examiner

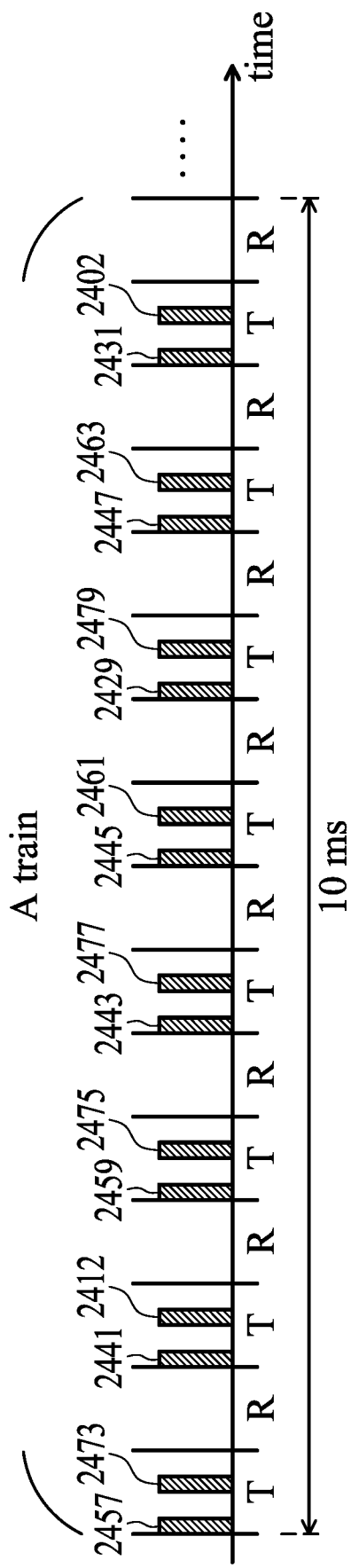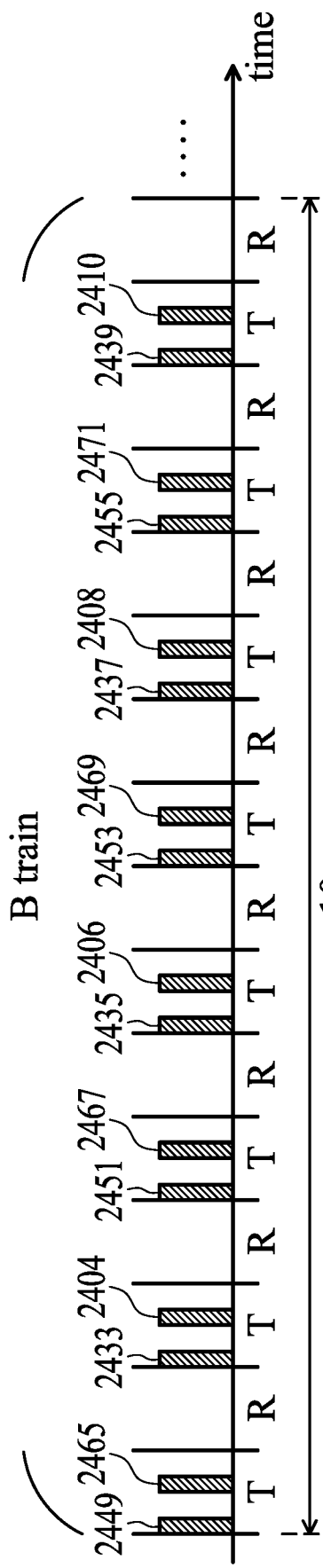
FIG. 1B
FIG. 1C

METHOD FOR HANDLING INTERFERENCE IN BLUETOOTH DEVICE HAVING OTHER WIRELESS TECHNOLOGY

CROSS REFERENCE TO RELATED APPLICATIONS

This application claims the benefit of U.S. Provisional Application No. 62/589,612 filed on Nov. 22, 2017, the entirety of which is incorporated by reference herein.

BACKGROUND OF THE INVENTION

Field of the Invention

The invention relates to wireless communication, and, in particular, to a wireless communication device and a method for adjusting frequency channels in a Bluetooth device.

Description of the Related Art

Bluetooth wireless technology is a short-range communications technology, which is able to replace cables which connect portable and/or fixed devices for communications while maintaining high levels of security. The key features of Bluetooth technology are robustness, low power, and low cost. The Bluetooth specification defines a uniform structure for a wide range of devices to connect and communicate with each other.

Bluetooth technology uses the 2.4 GHz Industrial, Scientific and Medical (ISM) band which is available worldwide. However, WiFi technology may also use the 2.4 GHz radio band that is subdivided into multiple channels such as from channel 1 to channel 14 for Tx and Rx packets. The WiFi technology and these other technologies (e.g. LTE, WiMAX, ZigBee, 4G technologies, etc.) may be added into the same physical product as Bluetooth technology, so isolation may be needed to protect the receiver of WiFi technology or other technologies from interference caused by transmissions from the Bluetooth technology. In addition, the channels for inquiry and paging in Bluetooth technology are pre-defined and cannot be changed arbitrarily. Depending on relevant filter characteristics, the performance of some frequencies used by the circuitry of WiFi technology or other technologies will be severely affected by the Bluetooth technology when the Bluetooth transceiver is performing inquiry or paging. As a result, the severe degradation of the throughput of the WiFi technology or other technologies may become unacceptable to the end user.

For example, in a Bluetooth device with a WiFi technology co-resident, a conventional solution is to disable some of frequency channels of the Bluetooth technology to prevent interference with operation of the WiFi receiver. However, Bluetooth page or inquiry requires certain duty cycles, and the corresponding disabling of some frequency channels of Bluetooth technology could significantly reduce the probability for the listening device to successfully find the inquiry device, resulting in much longer inquiry time or page time.

Accordingly, there is demand for a wireless communication device and a method for adjusting frequency channels in a Bluetooth device to solve the interference problem.

BRIEF SUMMARY OF THE INVENTION

A detailed description is given in the following embodiments with reference to the accompanying drawings.

In an exemplary embodiment, a wireless communication device is provided. The wireless communication device includes: Bluetooth circuitry, wireless-communication circuitry, radio frequency (RF) circuitry, and a controller. The wireless-communication circuitry implements wireless technology other than Bluetooth. The RF circuitry is coupled to the Bluetooth circuitry and the wireless-communication circuitry. The controller is adapted to control the Bluetooth circuitry and the wireless-communication circuitry to transceive data via the RF circuitry. Responsive to a band used by the wireless-technology circuitry, the Bluetooth circuitry replaces a plurality of in-band frequencies of a predetermined train by a plurality of out-of-band frequencies of another predetermined train.

In another exemplary embodiment, a method for adjusting frequency channels in a Bluetooth device is provided. The method includes the following steps: providing Bluetooth circuitry and wireless-technology circuitry of the Bluetooth device, wherein the wireless-technology circuitry implements wireless technology other than Bluetooth; and responsive to a band used by the wireless-technology circuitry, replacing a plurality of in-band frequencies of a predetermined train by a plurality of out-of-band frequencies of another predetermined train by the Bluetooth circuitry.

BRIEF DESCRIPTION OF THE DRAWINGS

The invention can be more fully understood by reading the subsequent detailed description and examples with references made to the accompanying drawings, wherein:

FIG. 1B is an example of the A-train in the inquiry sequence in the Bluetooth specification;

FIG. 1C is an example of the B-train in the inquiry sequence in the Bluetooth specification;

DETAILED DESCRIPTION OF THE INVENTION

The following description is made for the purpose of illustrating the general principles of the invention and should not be taken in a limiting sense. The scope of the invention is best determined by reference to the appended claims.

Bluetooth devices which are in range can discover and connect to each other without the need of a base station or access point. The Inquiry procedure is used for obtaining Bluetooth addresses and clocks of devices in range. Paging is used to connect to devices whose addresses and approximate clock values are known. Device discovery can be time consuming because the inquiry device does not know the frequency and time window in which other devices might be listening. Paging delays are much lesser because during paging an approximate idea of the clock of the paged device (through inquiry) is available.

Figure 1A:
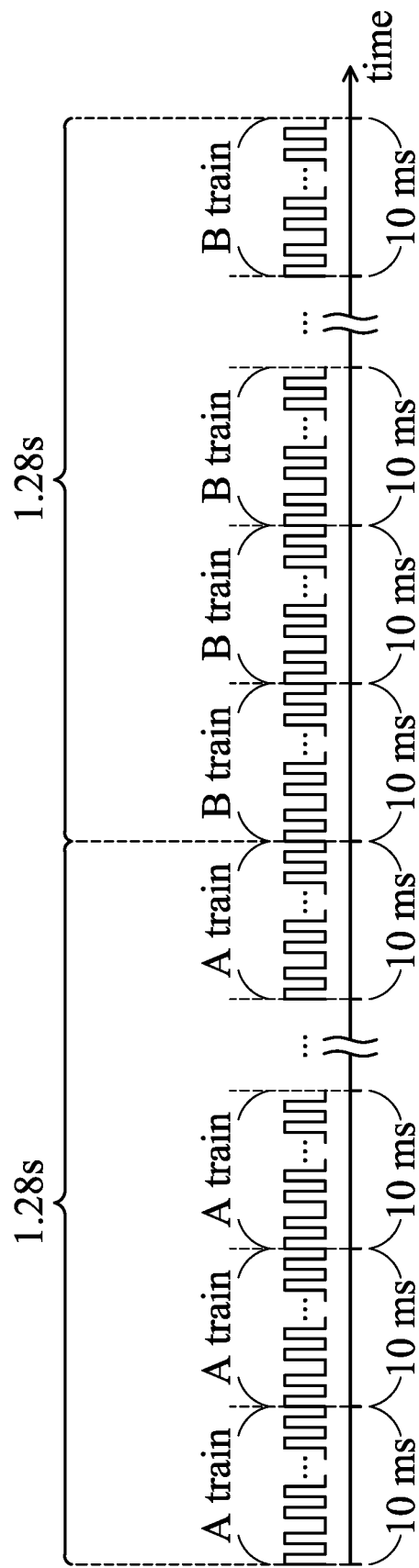
FIG. 1A is a timing diagram of the inquiry or page procedure in the Bluetooth specification.

FIG. 1A is an example of the inquiry or page procedure in the Bluetooth specification.

Bluetooth devices intended for use in short-range personal area networks operate from 2.4 to 2.4835 GHz. To reduce interference with other protocols that use the 2.4 GHz band, the Bluetooth protocol divides the band into 79 channels (numbered from 0 to 78, each 1 MHz wide) and changes channels up to 1600 times per second. All Bluetooth devices default to a standby mode. In a standby mode, unconnected devices periodically listen for messages. This procedure is called scanning which is divided into two types: page scan and inquiry scan. A page scan is defined as a connection sub-state in which a device listens for its own device access code (DAC) (via a "page") for the default scan window duration (11.25 ms) every 1.28 seconds in order to set up an actual connection between devices. An inquiry scan is very similar to a page scan except that in this sub-state the receiving device scans for the inquiry access code (IAC) (via an "inquiry"). The inquiry scan is used to discover which devices are in a range and addresses and clocks of devices in the range. Therefore, the default scan procedure is typically performed during the scan window (11.25 ms) for a Bluetooth device.

For example, the inquiry scan uses a fixed frequency hopping pattern (containing 32 frequencies) that is derived from the clock of the inquiring Bluetooth device (the device performing inquiry), and the General Inquiry Access Code (GIAC). The inquiring device (i.e., in an inquiry sub-state) transmits two ID packets on two inquiry frequencies and then listens for a response on two inquiry response frequencies. The device performing inquiry scanning (the discoverable device in an inquiry-scan sub-state) conversely listens for the ID packets on a frequency from the complete set of inquiry frequencies, and responds on an inquiry response frequency that corresponds to the inquiry frequency used for listening. The inquiry frequency and the inquiry response frequency used by the discoverable device are thus related as a frequency pair. The inquiry frequency and the inquiry response frequency of that frequency pair are also respectively referred to herein as the first and second frequencies of the pair.

The example of the A-train and B-train in Bluetooth technology are shown in FIG. 1B and FIG. 1C, respectively. T denotes the transmission cycle, and R denotes the reception cycle. The numeral shown above each of the inquiry ID packets refers to the frequency in MHz (i.e., frequency channel) used by each of the inquiry ID packets in the A-train or the B-train.

Figure 2A:
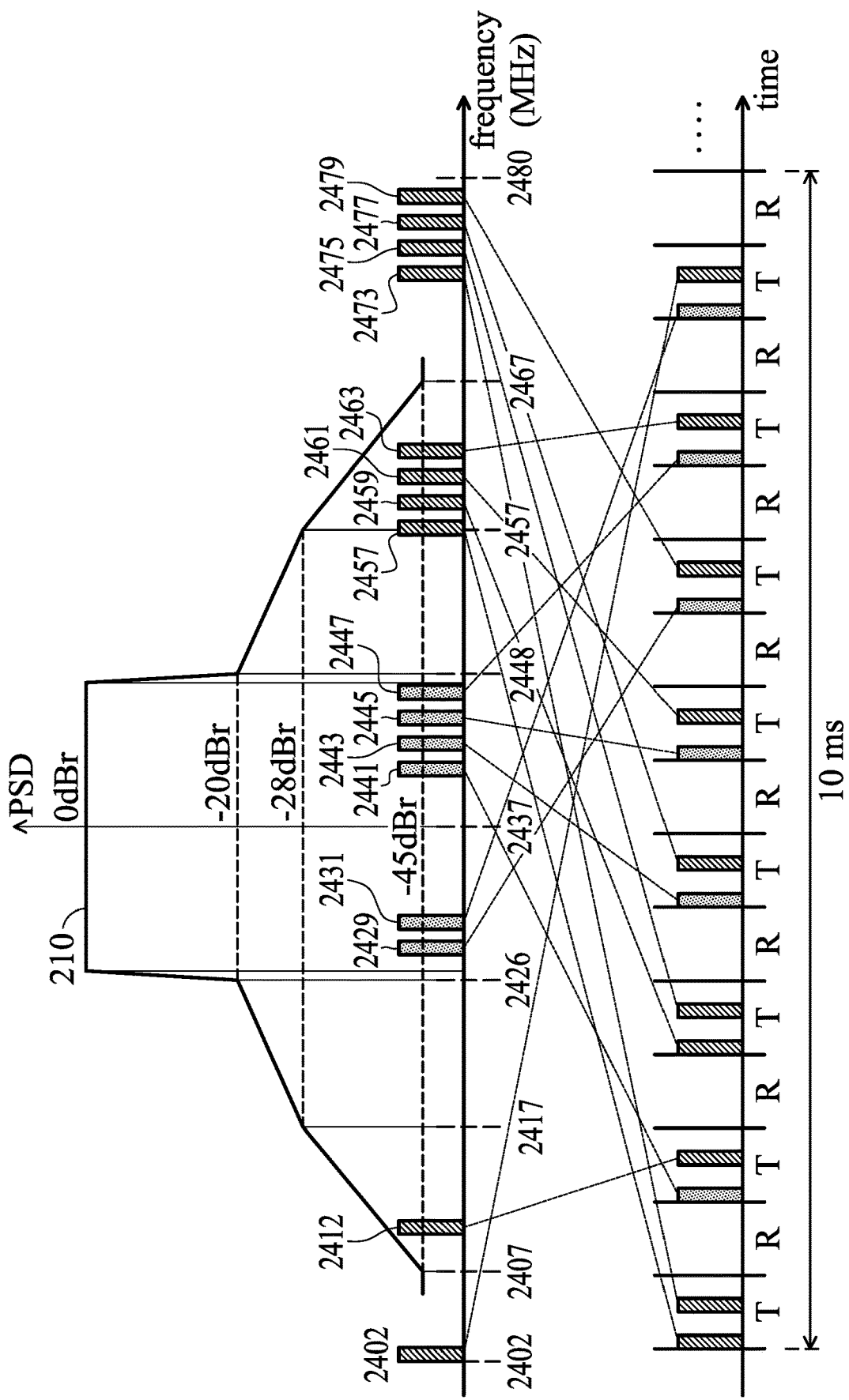
FIG. 2A is a diagram of the spectrum diagram of the WiFi Channel 6 and the frequencies used by the A-train in accordance with an embodiment of the invention.
Figure 2B:
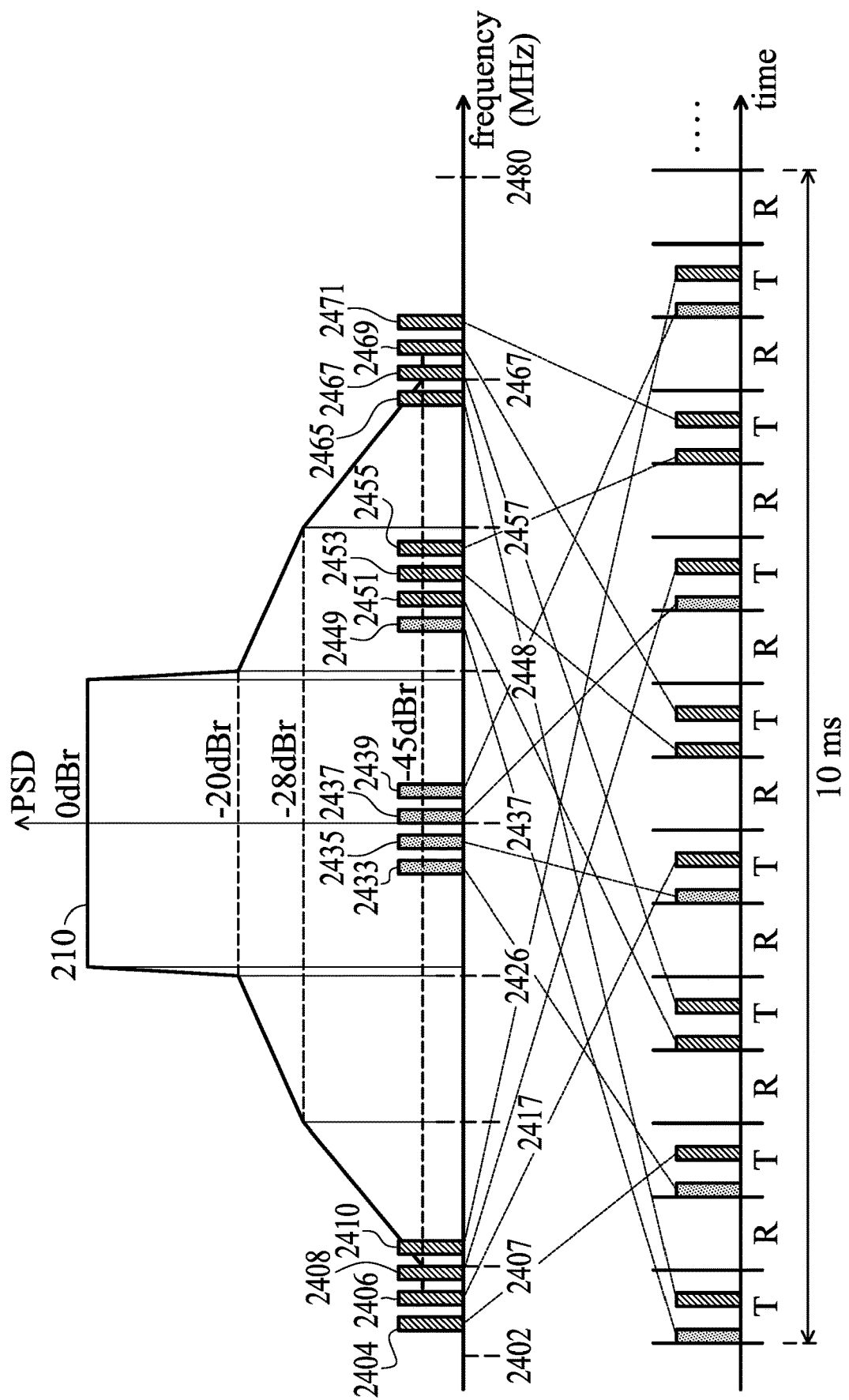
FIG. 2B is a diagram of the spectrum diagram of the WiFi Channel 6 and the frequencies used by the B-train in accordance with an embodiment of the invention.

FIG. 2A is a diagram of the spectrum diagram of the WiFi Channel 6 and the frequencies used by the A-train in accordance with an embodiment of the invention. FIG. 2B is a diagram of the spectrum diagram of the WiFi Channel 6 and the frequencies used by the B-train in accordance with an embodiment of the invention.

WiFi is a technology for wireless local area networking with devices based on the IEEE 802.11 standards. With regard to the WiFi technology (e.g., IEEE 802.11 b/g/n), fourteen channels are designated in the 2.4 GHz range, spaced 5 MHz apart from each other except for a 12 MHz space before channel 14. When two or more 802.11b transmitters are operated in the same airspace, their signals must be attenuated by −50 dBr and/or separated by 22 MHz to prevent interference. This is because the DSSS (Direct Sequence Spread Spectrum) algorithm used by the IEEE 802.11b transmits data logarithmically along a 20 MHz bandwidth. The remaining 2 MHz gap is used as a guard band to allow sufficient attenuation along the edge channels. In other words, each WiFi channel may have a 22 MHz bandwidth including the guard band. In the IEEE 802.11g and 802.11n standards, each WiFi channel has a 20 MHz bandwidth. In some implementations, the bandwidth of each WiFi channel can be adjusted to 40 MHz.

As depicted in FIG. 2A, curve 210 denotes the power spectral density (PSD) of WiFi Channel 6, which has a center frequency of 2437 MHz, and the channel bandwidth of WiFi Channel 6 is 22 MHz (e.g., ranging from 2426 MHz to 2448 MHz). The PSD of WiFi Channel 6 is significantly attenuated to −20 dBr at the band boundary of the WiFi Channel 6 (e.g., 2426 Mhz and 2448 Mhz) and six frequency channels in the A-train are overlapped with the band of WiFi Channel 6, such as 2429, 2431, 2441, 2443, 2445, and 2447 MHz.

Similarly, as depicted in FIG. 2B, five frequency channels in the B-train are overlapped with the band of WiFi Channel 6, such as 2449, 2433, 2435, 2437, and 2439 MHz.

Specifically, if one of the frequency channels of the A-train or B-train is within the band of WiFi Channel 6 (i.e., in-band), the performance of the WiFi function will be severely interfered. For example, the lower portion in FIG. 2A shows the A-train in association with the frequencies labeled on the spectrum diagram in the upper portion in FIG. 2A. Since the frequencies used in each of the transmission cycle are predefined in the Bluetooth specification, it can be understood that there are 6 transmission cycles within the band of WiFi Channel 6, and the performance of the WiFi circuitry will be affected in these 6 transmission cycles.

Similarly, the lower portion in FIG. 2B shows the B-train in association with the frequencies labeled on the spectrum diagram in the upper portion in FIG. 2B. Since the frequencies used in each of the transmission cycle are predefined in the Bluetooth specification, it can be understood that there are 5 transmission cycles within the band of WiFi Channel 6, and the performance of the WiFi circuitry will degrade in these 5 transmission cycles.

Figure 3A:
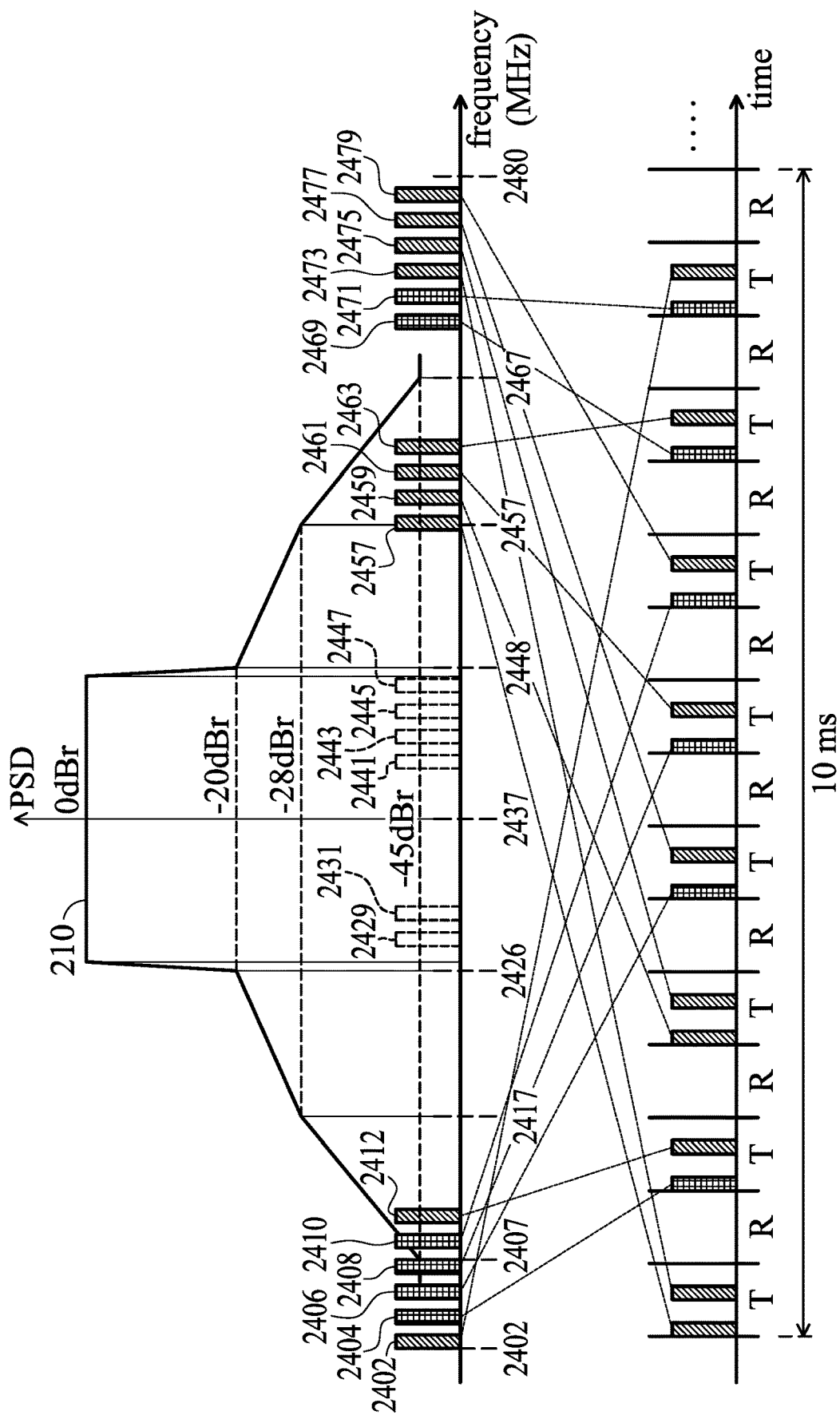
FIG. 3A is a diagram of the spectrum diagram of the WiFi Channel 6 and the frequency channels used by the modified A-train in accordance with an embodiment of the invention.
Figure 3B:
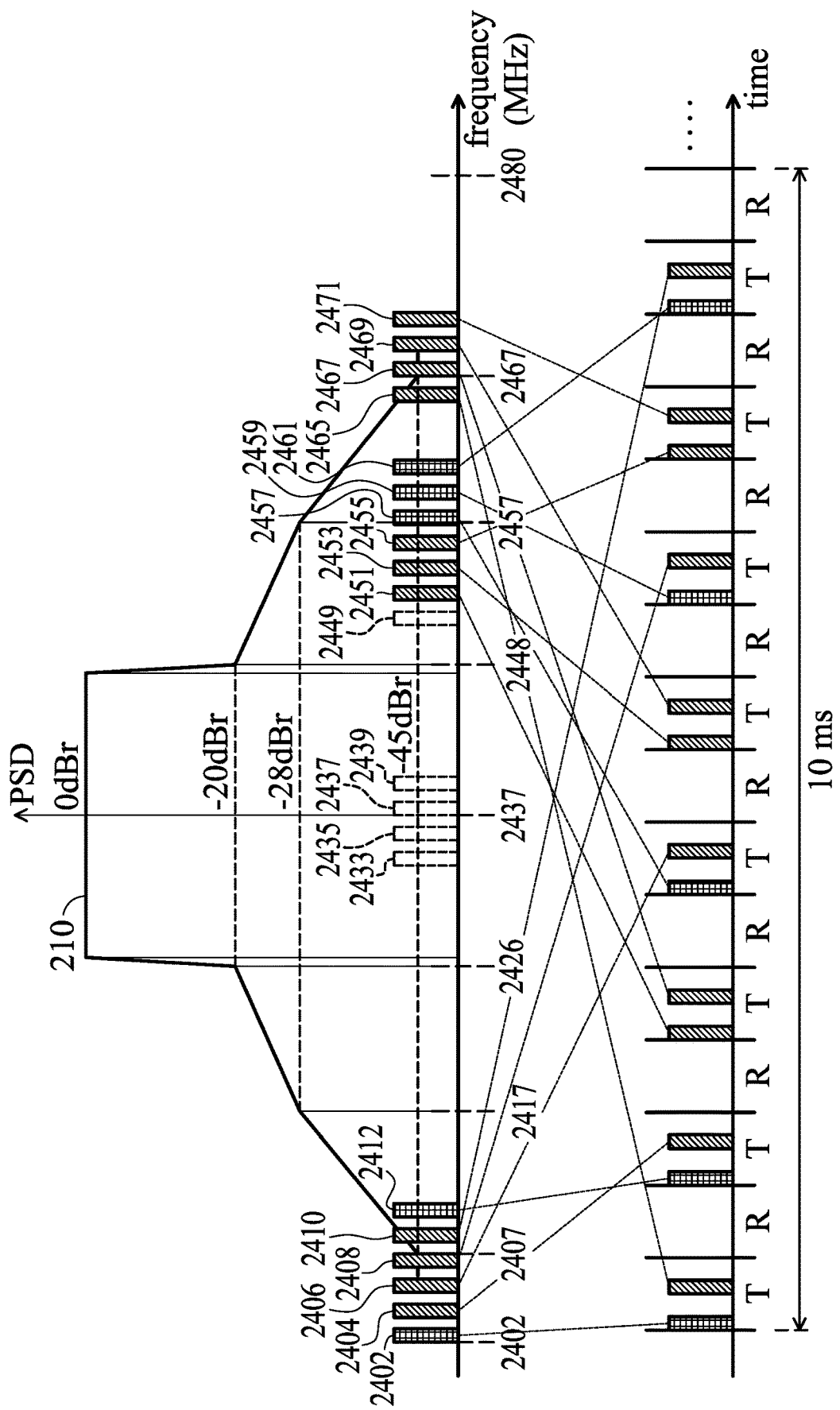
FIG. 3B is a diagram of the spectrum diagram of the WiFi Channel 6 and the frequencies used by the modified B-train in accordance with an embodiment of the invention.

FIG. 3A is a diagram of the spectrum diagram of the WiFi Channel 6 and the frequency channels used by the modified A-train in accordance with an embodiment of the invention. FIG. 3B is a diagram of the spectrum diagram of the WiFi Channel 6 and the frequencies used by the modified B-train in accordance with an embodiment of the invention.

Referring to FIG. 3A, in an embodiment, since the center frequency (e.g., 2437 MHz) and the bandwidth (e.g., 22 MHz) of WiFi Channel 6 is known, the six inquiry ID packets using the frequency channels of the A-train within the band of WiFi Channel 6 are absent while transmitting the A-train. However, these absent inquiry ID packets can be replaced by the inquiry ID packets using the frequency channels in the B-train that are not within the band of WiFi Channel 6.

For example, on the upper portion of FIG. 3A, the in-band frequencies in the original A-train (i.e., 2441, 2443, 2445, 2429, 2447, and 2431) are replaced by the out-band frequency channels 2404, 2406, 2408, 2410, 2469, and 2471 in the B-train.

In the embodiment, six additional frequency channels 2404, 2406, 2408, 2410, 2469, and 2471 in the B-train are used. The inquiry ID packets in the 3rd, 7th, 9th, 11th, 13th, and 15th cycles use the frequency channels 2404, 2406, 2408, 2410, 2469, and 2471 in the B-train, respectively. It should be noted that the six frequency channels 2404, 2406, 2408, 2410, 2469, and 2471 in the B-train are distributed into the six cycles in ascending order, but the invention is not limited thereto. For example, the selection of the frequency channels for the first inquiry ID packets in the six cycles can be determined using a descending order, a pseudo-random order or a predetermined order other than the above-mentioned orders.

In another embodiment, since the number of "in-band" frequency channels (i.e., first frequencies) in the current frequency train is smaller than or equal to the number of "out-of-band" frequency channels (i.e., second frequencies) in the other frequency train, the selection of the out-of-band frequency channels can be determined according to the difference value between the out-of-band frequency channel and the center frequency of the predefined range (e.g., 2437 MHz for WiFi Channel 6). For example, a specific frequency in the current frequency train that is farther away from the center frequency of the band used by the Wifi circuitry will cause less interference to WiFi circuitry. If a portion of the second frequencies that are farther away from the center frequency of the band can be selected prior to the other portion of the second frequencies that are closer to the center frequency of the band, the amount of interference caused to the Wifi circuitry can be reduced. That is, the second frequency that is farther away from the center frequency of the band used by the WiFi circuitry has a higher priority to replace one of the first frequencies in the current frequency train.

Accordingly, the original A-train can be replaced by the modified A-train, and all of the frequency channels in the modified A-train are out of the band of WiFi Channel 6. It should be noted that a single A-train is transmitted within 10 ms, and the modified A-train will be repeated 128 times a predetermined times (e.g., 128 times, 256 times, etc.) (i.e., a single A-train is transmitted within 10 ms) in associated with an inquiry scan interval (i.e., 1.28 second, 2.56 seconds, etc.) according to the Bluetooth specification.

Referring to FIG. 3B, five inquiry ID packets using the frequency channels (i.e., Bluetooth frequency channels 2433, 2435, 2437, 2439, and 2449) of the B-train within the band of WiFi Channel 6 may be absent while transmitting the B-train. However, these absent inquiry ID packets can be replaced by the inquiry ID packets using the frequency channels in the A-train that are not within the band of WiFi Channel 6.

For example, on the upper portion of FIG. 3B, the in-band frequencies in the original B-train (i.e., 2449, 2433, 2435, 2437, and 2439) are replaced by the out-band frequencies of the frequency channels 2402, 2412, 2457, 2459, and 2461 in the A-train.

In the embodiment, five additional frequency channels 2402, 2412, 2457, 2459, and 2461 in the A-train are used. The inquiry ID packets in the 1st, 3rd, 7th, 11th, and 15th cycles use the five frequency channel 2402, 2412, 2457, 2459, and 2461 in the A-train, respectively. It should be noted that the five frequency channels 2402, 2412, 2457, 2459, and 2461 in the A-train are distributed into the five cycles in the B-train in ascending order, but the invention is not limited thereto. For example, the selection of the frequency channels for the first inquiry ID packets in the five cycles can be determined using a descending order, a pseudo-random order, or a predetermined order other than the above-mentioned orders. Accordingly, the original B-train can be replaced by the modified B-train, and all of the frequency channels in the modified B-train are out of the band of WiFi Channel 6. It should be noted that a single B-train is transmitted within 10 ms, and the modified B-train will be repeated a predetermined times (e.g., 128 times, 256 times, etc.) associated with the inquiry scan interval (i.e., 1.28 second, 2.56 seconds, etc.) according to the Bluetooth specification.

Figure 7A:
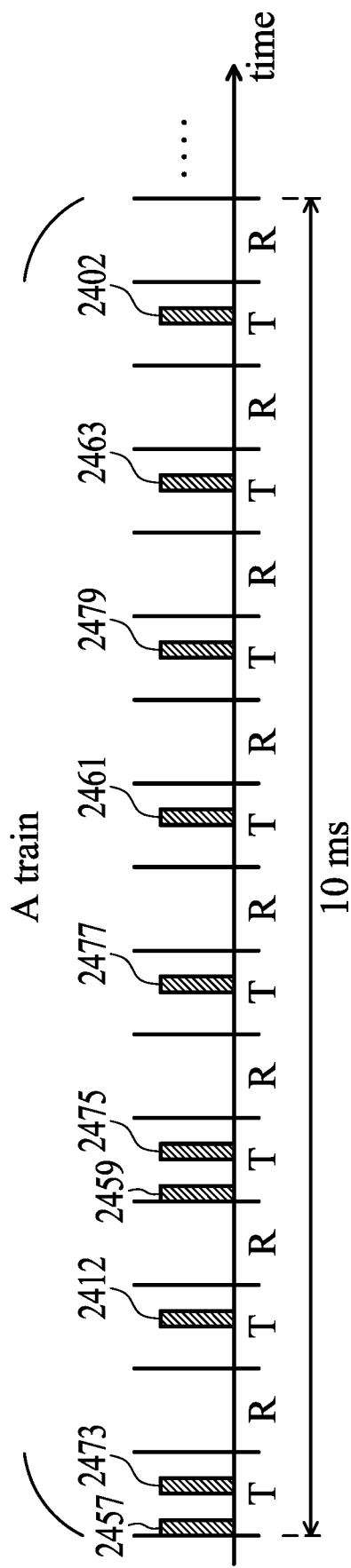
FIG. 7A is an example of the A-train in the inquiry sequence using the conventional method.
Figure 7B:
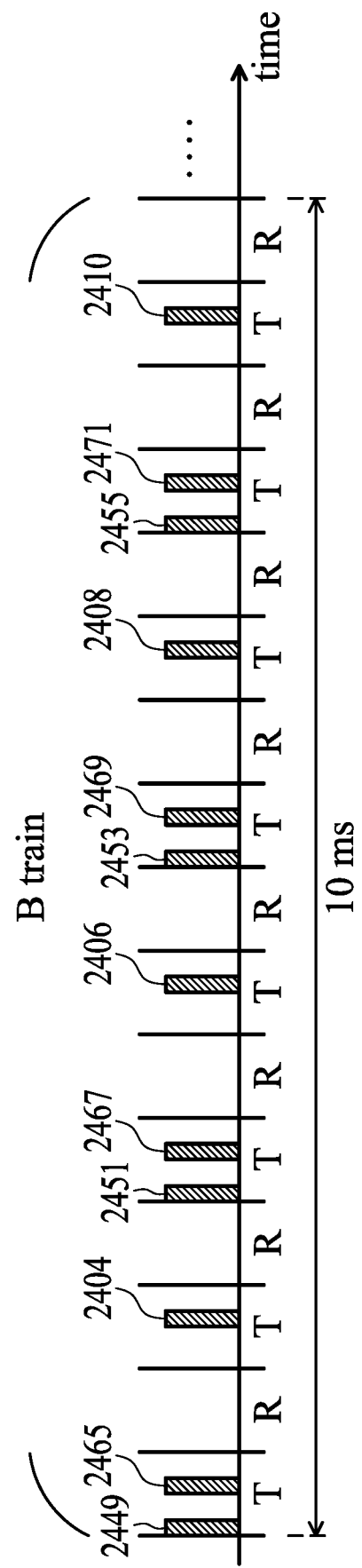
FIG. 7B is an example of the B-train in the inquiry sequence using the conventional method.

In this regard, the conventional method does not transmit the ID packet using one of the "in-band" frequency channels. In other words, the number of candidate frequency channels (i.e., out-of-band frequency channels) in the A-train or B-train (i.e., the current frequency train) is reduced in the conventional method due to the absent "in-band" frequency channels. Given that the band of WiFi Channel 6 is 22 MHz, when compared with the original A-train in FIG. 1B and the original B-train in FIG. 1C, ID packets using the frequency channels 2429, 2431, 2441, 2443, 2445, and 2447 are absent in the A-train in FIG. 7A, and ID packets using the frequency channels 2433, 2435, 2437, and 2439 are absent in the B-train in FIG. 7B. Accordingly, the probability for the listening device to successfully find the inquiry device using the conventional method is also significantly reduced, resulting in much longer inquiry delay or page delay.

In the present invention, in order to prevent the Bluetooth circuitry from interfering the WiFi circuitry, the "in-band" frequency channels in either the A-train or the B-train (i.e., the current frequency train) can be replaced with the "out-of-band" frequency channels in the other of the A-train or the B-train (i.e., the other frequency train). Since there are 8 transmission cycles and each transmission cycle includes two ID packets with two candidate frequency channels in the A-train or B-train, the number of candidate frequency channels can be kept at 16 in the A-train or B-train (i.e., the current train), and the probability for the listening device to successfully find the inquiry device in the present invention can be maintained without sacrificing the performance of the WiFi circuitry.

It should be noted that the number of additional frequency channels selected from the A-train or B-train is determined by a predefined range of "in-band" frequencies. The "in-band" frequencies can be defined by various ways and are not limited thereto. For example, the power spectral density of the signal in WiFi Channel 6 is attenuated to −20 dBr with a bandwidth of 22 MHz, and is attenuated to −28 dBr with a bandwidth of 40 MHz. If the Bluetooth frequency channel is within the 22 MHz bandwidth of WiFi Channel 6, the performance of the WiFi circuitry may severely degrade. If the predefined range is set to 22 MHz, the frequencies from 2426 MHz to 2448 MHz are excluded from the A-train and B-train.

For example, referring to FIG. 3A, the predefined range of the WiFi Channel 6 is set to 26 MHz such as +/−13 MHz away from the center frequency 2437 MHz of WiFi Channel 6. Accordingly, in the A-train, the frequency channels 2429, 2431, 2441, 2443, 2445, and 2447 are "in-band" frequency channels, and the frequency channels 2402, 2412, 2457, 2459, 2461, 2463, 2473, 2475, 2477, and 2479 are "out-of-band" frequency channels.

Similarly, referring to FIG. 3B, the predefined range of the WiFi Channel 6 is also set to 26 MHz such as +/−13 MHz away from the center frequency 2437 MHz of WiFi Channel 6. Accordingly, in the B-train, the frequency channels 2433, 2435, 2437, 2439, and 2449 are "in-band" frequency channels, and the frequency channels 2404, 2406, 2408, 2410, 2451, 2453, 2455, 2465, 2467, 2469, and 2471 are "out-of-band" frequency channels.

It should be noted that the invention is not limited to the aforementioned predefined range, and the predefined range of the in-band frequencies of the WiFi Channel 6 can be adjusted according to practical conditions such as an isolation level or distance between the Bluetooth circuitry and the WiFi circuitry, such that the number of in-band frequency channels (i.e., first frequencies) in the current frequency train (i.e., the A-train or the B-train) is smaller than or equal to that of out-of-band frequency channels (i.e., second frequencies) in the other of the A-train or B-train.

Although the embodiments of FIGS. 3A and 3B are for the inquiry procedure in Bluetooth technology, a similar manner can be applied to the page procedure in Bluetooth technology.

Specifically, with regard to the A-train or B-train in the page procedure, the 16 frequencies used in each of the A-train or B-train are calculated using the paged unit's Bluetooth Device Address BD_ADDR. However, some of the calculated 16 frequencies in the A-train or B-train may be in the band of WiFi Channel 6. Thus, a similar scheme described in the embodiments of FIGS. 3A and 3B can be used on the A-train or B-train in the page procedure.

Figure 4:
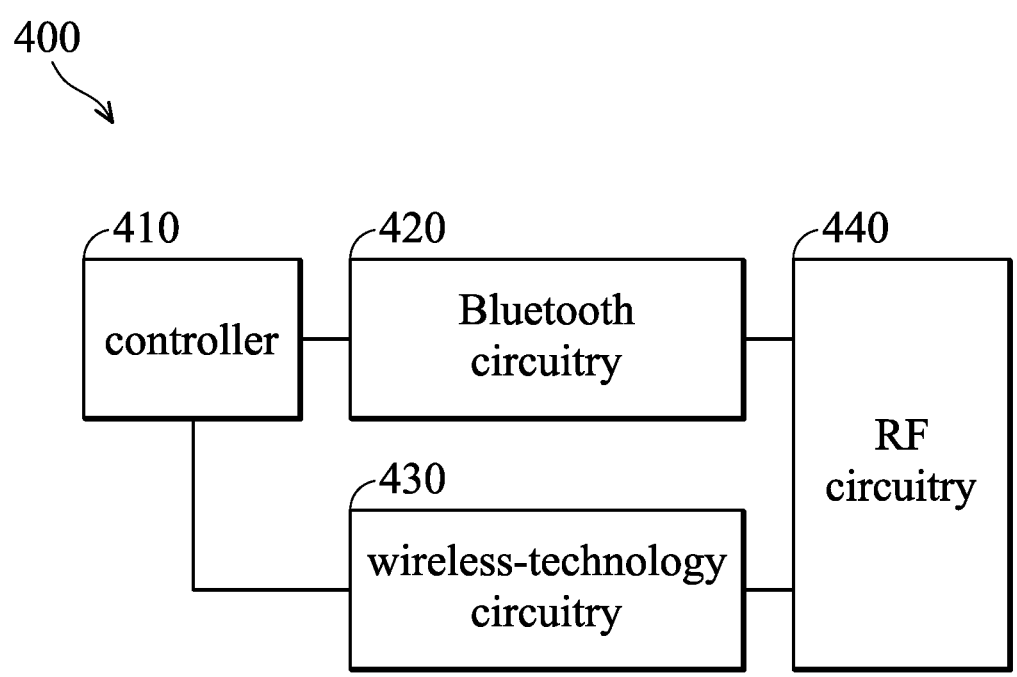
FIG. 4 is a diagram of a wireless communication device in accordance with an embodiment of the invention.

FIG. 4 is a diagram of a wireless communication device in accordance with an embodiment of the invention. The wireless communication device 400 includes a controller 410, Bluetooth circuitry 420, wireless-technology circuitry 430, and radio-frequency (RF) circuitry 440. The controller 410 may be a microcontroller (MCU) or a general-purpose processor, but the invention is not limited thereto. The Bluetooth circuitry 420 and the wireless-technology circuitry 430 are electrically connected to the controller 410 and the RF circuitry 440. The Bluetooth circuitry 420 is configured to perform the functions defined in the Bluetooth specification such as Bluetooth revision 1.0 or later-developed revisions. The wireless-technology circuitry 430 may include one or more wireless technology (e.g., WiFi, LTE, WiMax, ZigBee, or other technologies) portions. The WiFi portion 431 in the wireless-technology circuitry 430 may perform the wireless transmission functions defined in the IEEE 802.11 b/g/n standards. The controller 410 may control the Bluetooth circuitry 420 and the wireless-technology circuitry 430 according to a predefined set of instructions or program codes stored in a non-volatile or volatile memory (not shown) to transceive data via the RF circuitry 440.

The Bluetooth circuitry 420 and the wireless-technology circuitry 430 may be implemented by separate integrated circuits that are placed on a printed circuit board in a very short distance away from each other. As a result, severe interference between the Bluetooth circuitry 420 and the portions in the wireless-technology circuitry 430 operating in the ISM band (i.e., 2.4 GHz) will be inevitably occur. Thus, the techniques to replace the in-band frequency channels in the current train (i.e., either the A-train or the B-train) of the Bluetooth circuitry 420 with the out-of-band frequency channels in the other train (i.e., the other of the A-train or the B-train) can be applied to the Bluetooth circuitry 420.

In addition, although the band used by other wireless technology portions (i.e., LTE, WiMAX, ZigBee, etc.) are immediately above or below the 2.4 GHz band, some of the frequency channels used by the Bluetooth circuitry 420 may be within the band used by these wireless-technology portions. Accordingly, the "in-band" frequency channels in the A-train or B-train can be replaced with the "out-of-band" frequency channels in the other of the A-train or B-train, thereby preventing the Bluetooth circuitry 420 from causing interference to the wireless-technology portions in the wireless-technology circuitry 430.

Figure 5:
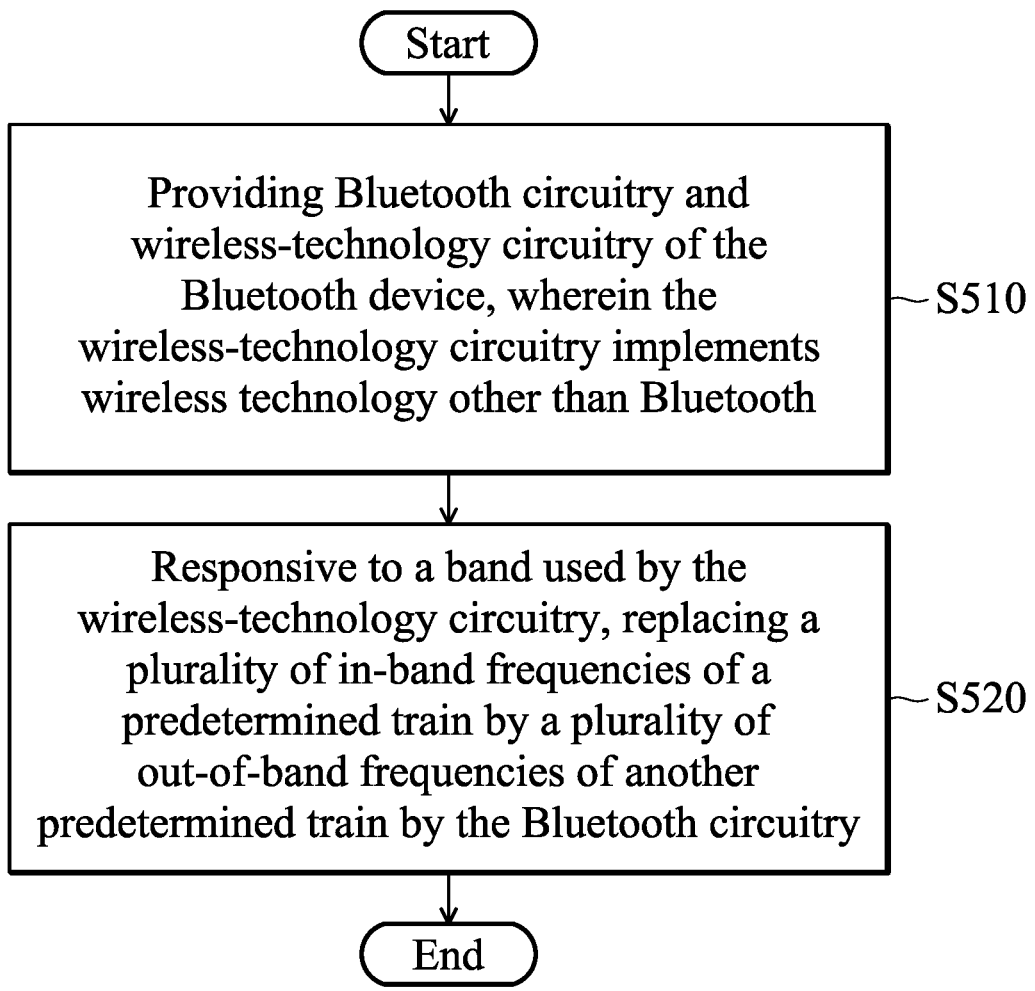
FIG. 5 is a flow chart of a method of adjusting frequency channels in a Bluetooth device with other wireless-technology co-resident in accordance with an embodiment of the invention.

FIG. 5 is a flow chart of a method of adjusting frequency channels in a Bluetooth device with other wireless-technology co-resident in accordance with an embodiment of the invention. For example, the other wireless-technology co-resident may be wireless-technology circuitry supporting standards using the 2.4 GHz range other than Bluetooth, such as WiFi, LTE, WiMAX, ZigBee, etc. The method includes the following steps:

Step S510: providing Bluetooth circuitry and wireless-technology circuitry of the Bluetooth device, wherein the wireless-technology circuitry implements wireless technology other than Bluetooth. For example, referring to FIG. 4, the Bluetooth circuitry 420 is configured to perform the functions defined in the Bluetooth specification such as Bluetooth revision 1.0 or later-developed revisions. The wireless-technology circuitry 430 may include one or more wireless technology (e.g., WiFi, LTE, WiMax, ZigBee, or other technologies) portions. The WiFi portion 431 in the wireless-technology circuitry 430 may perform the wireless transmission functions defined in the IEEE 802.11 b/g/n standards. The Bluetooth circuitry 420 and the wireless-technology circuitry 430 may be implemented by separate integrated circuits that are placed on a printed circuit board in a very short distance away from each other.

Step S520: responsive to a band used by the wireless-technology circuitry, replacing a plurality of in-band frequencies of a predetermined train by a plurality of out-of-band frequencies of another predetermined train by the Bluetooth circuitry. For example, step S520 can be subdivided into steps S521-S523, as shown in FIG. 6.

Figure 6:
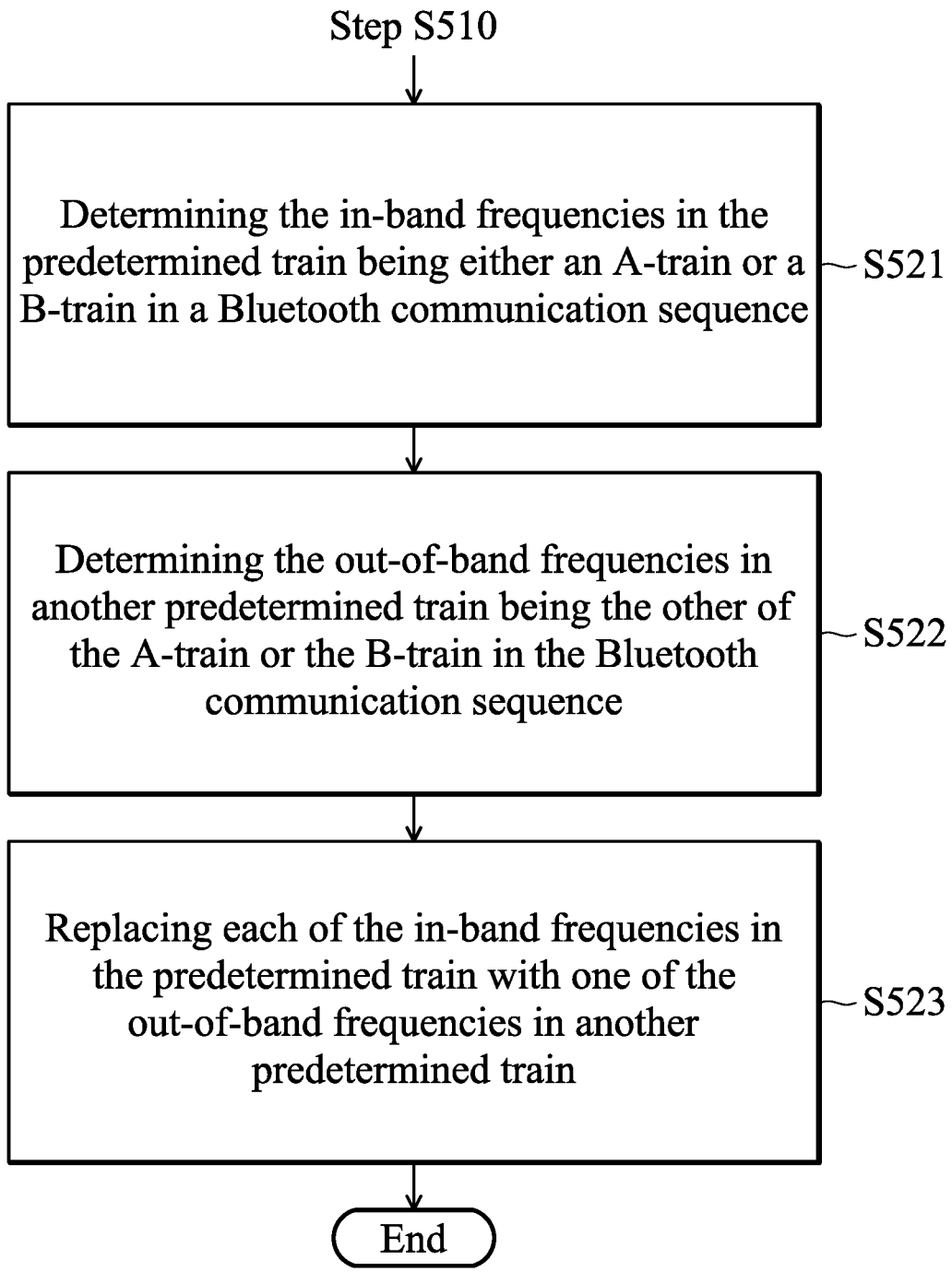
FIG. 6 is a flow chart of step S520 in accordance with the embodiment of FIG. 5.

FIG. 6 is a flow chart of step S520 in accordance with the embodiment of FIG. 5. For example, step S520 includes steps S521, S522, and S523.

Step S21: the Bluetooth circuitry 420 (or the controller 410) determines the in-band frequencies in the predetermined train being either an A-train or a B-train in a Bluetooth communication sequence. For example, the Bluetooth communication sequence may be an inquiry sequence or a paging sequence. In addition, the "in-band" range used by the wireless-technology circuitry may be a predefined range of frequencies.

Step S522: the Bluetooth circuitry 420 (or the controller 410) determines the out-of-band frequencies in another predetermined train being the other of the A-train or the B-train in the Bluetooth communication sequence. For example, the predefined range may be an appropriate bandwidth, so that the number of "in-band" frequencies (i.e., the first frequencies) in the predetermined train (i.e., the A-train or the B-train) is lower than or equal to the number of "out-of-band" frequencies (i.e., second frequencies) in another predetermined train (i.e., the other of the A-train or the B-train).

Step S523, the Bluetooth circuitry 420 (or the controller 410) replaces each of the in-band frequencies in the predetermined train with one of the out-of-band frequencies in another predetermined train. For example, if the predetermined train is the A-train, each of the "in-band" frequencies in the A-train is replaced with one of the "out-of-band" frequencies in the B-train, thereby obtaining a modified A-train. If the Bluetooth communication sequence is an inquiry sequence, the modified A-train can be the one illustrated in FIG. 3A. Similarly, if the predetermined train is the B-train, each of the "in-band" frequencies in the B-train is replaced with one of the "out-of-band" frequencies in the A-train, thereby obtaining a modified B-train. If the Bluetooth communication sequence is an inquiry sequence, the modified B-train can be the one illustrated in FIG. 3B.

In addition, if the Bluetooth communication sequence is a paging sequence, the frequencies used in the A-train or B-train are calculated using the paged device's Bluetooth Device Address BD_ADDR. Thus, the order of frequencies in the transmission cycles of the A-train or B-train in the paging sequence is different from that in the inquiry sequence. However, a similar frequency-replacing scheme described in the aforementioned embodiments can be applied to the A-train or B-train in the paging sequence.

Moreover, although the embodiments in FIGS. 3A and 3B are described for the Bluetooth and WiFi co-existence, the concept of replacing the "in-band" frequencies of another wireless technology in either the A-train or the B-train with the "out-of-band" frequencies in the other of the A-train or B-train can also be used.

In view of the above, a wireless communication device and a method for adjusting frequency channels in a Bluetooth device are provided. The wireless communication device and the method are capable of adjusting the frequency channels in the current frequency train in a Bluetooth communication sequence such as an inquiry sequence or a paging sequence. The frequency channels in the current frequency train (i.e., the A-train or the B-train) that are within the band used by the wireless-communication circuitry (e.g., WiFi Channel 6 used by the WiFi circuitry) are replaced with frequency channels in the other frequency train (i.e., the other of the A-train or B-train) that are out of the band used by the wireless-communication circuitry, so that the number of candidate frequency channels in the current frequency train can be maintained (e.g., 16 candidate frequency channels), thereby reducing the inquiry delay and paging delay of the Bluetooth device without causing interference to the WiFi circuitry.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless communication device, comprising:
   Bluetooth circuitry;
   wireless-communication circuitry implementing wireless technology other than Bluetooth;
   radio frequency (RF) circuitry coupled to the Bluetooth circuitry and the wireless-communication circuitry; and
   a controller, adapted to control the Bluetooth circuitry and the wireless-communication circuitry to transceive data via the RF circuitry;
   wherein responsive to a band used by the wireless-technology circuitry, the Bluetooth circuitry replaces a plurality of in-band frequencies of a predetermined train by a plurality of out-of-band frequencies of another predetermined train.

2. The wireless communication device as claimed in claim 1, wherein the predetermined train is either an A-train or a B-train in a Bluetooth communication sequence, and the another predetermined train is the other of the A-train or B-train in the Bluetooth communication sequence.

3. The wireless communication device as claimed in claim 2, wherein the Bluetooth communication sequence is an inquiry sequence or a paging sequence.

4. The wireless communication device as claimed in claim 3, wherein the replaced predetermined train is repeated a predetermined times associated with a scan interval of the Bluetooth communication sequence.

5. The wireless communication device as claimed in claim 1, wherein the band used by the wireless-technology circuitry is determined by a predefined range.

6. The wireless communication device as claimed in claim 5, wherein a number of the in-band frequencies is smaller than or equal to a number of the out-of-band frequencies.

7. The wireless communication device as claimed in claim 6, wherein each of the in-band frequencies in the predetermined train is replaced by one of the out-of-band frequencies in ascending order or descending order.

8. The wireless communication device as claimed in claim 6, wherein each of the in-band frequencies in the predetermined train is replaced by one of the out-of-band frequencies in a pseudo-random order.

9. The wireless communication device as claimed in claim 6, wherein one of the out-of-band frequencies that is farther away from a center frequency of the band used by the wireless-technology circuitry has a higher priority to replace one of the in-band frequencies in the predetermined train.

10. The wireless communication device as claimed in claim 1, wherein the wireless-communication circuitry implements WiFi technology.

11. A method for adjusting frequency channels in a Bluetooth device, the method comprising:
    providing Bluetooth circuitry and wireless-technology circuitry of the Bluetooth device, wherein the wireless-technology circuitry implements wireless technology other than Bluetooth; and
    responsive to a band used by the wireless-technology circuitry, replacing a plurality of in-band frequencies of a predetermined train by a plurality of out-of-band frequencies of another predetermined train by the Bluetooth circuitry.

12. The method as claimed in claim 11, wherein the predetermined train is either an A-train or a B-train in a Bluetooth communication sequence, and the another predetermined train is the other of the A-train or B-train in the Bluetooth communication sequence.

13. The method as claimed in claim 12, wherein the Bluetooth communication sequence is an inquiry sequence or a paging sequence.

14. The method as claimed in claim 13, wherein the replaced predetermined train is repeated a predetermined times associated with a scan interval of the Bluetooth communication sequence.

15. The method as claimed in claim 11, wherein the band used by the wireless-technology circuitry is determined by a predefined range.

16. The method as claimed in claim 15, wherein a number of the in-band frequencies is smaller than or equal to a number of the out-of-band frequencies.

17. The method as claimed in claim 16, wherein each of the first frequencies in the predetermined train is replaced by one of the out-of-band frequencies in ascending order or descending order.

18. The method as claimed in claim 16, wherein each of the in-band frequencies in the predetermined train is replaced by one of the out-of-band frequencies in a pseudo-random order.

19. The method as claimed in claim 16, wherein one of the out-of-band frequencies that is farther away from a center frequency of the band used by the wireless-technology circuitry has a higher priority to replace one of the in-band frequencies in the predetermined train.

20. The method as claimed in claim 11, wherein the wireless-communication circuitry implements WiFi technology.

\* \* \* \* \*